US008867236B2

(12) United States Patent
Hu

(10) Patent No.: US 8,867,236 B2
(45) Date of Patent: Oct. 21, 2014

(54) COMPUTER SYSTEM WITH SPACE FOR GUIDING CABLES

(75) Inventor: Xiu-Quan Hu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 149 days.

(21) Appl. No.: 13/615,893

(22) Filed: Sep. 14, 2012

(65) Prior Publication Data
US 2013/0163173 A1 Jun. 27, 2013

(30) Foreign Application Priority Data
Dec. 24, 2011 (CN) .......................... 2011 1 0438366

(51) Int. Cl.
H02B 1/20 (2006.01)
H02B 1/01 (2006.01)
H02G 3/04 (2006.01)
H02G 3/00 (2006.01)

(52) U.S. Cl.
USPC ........... 361/826; 361/825; 174/68.3; 174/100

(58) Field of Classification Search
USPC ............ 361/724–727, 825–826; 174/50, 100, 174/101, 68.3; 211/26; 312/223.1, 223.2
See application file for complete search history.

(56) References Cited

U.S. PATENT DOCUMENTS

| 5,825,635 | A | * | 10/1998 | Mukoyama et al. .......... 361/826 |
| 6,127,631 | A | * | 10/2000 | Green et al. ................. 174/72 A |
| 6,924,989 | B2 | * | 8/2005 | Hall .............................. 361/826 |
| 8,243,455 | B1 | * | 8/2012 | Raymond et al. ............ 361/727 |
| 8,472,198 | B2 | * | 6/2013 | Peng et al. .................... 361/724 |
| 8,625,285 | B2 | * | 1/2014 | Peng et al. .................... 361/724 |
| 2011/0221320 | A1 | * | 9/2011 | Petrick et al. ................ 312/327 |

* cited by examiner

Primary Examiner — Nidhi Desai
(74) Attorney, Agent, or Firm — Novak Druce Connolly Bove + Quigg LLP

(57) ABSTRACT

A computer system includes an enclosure, at least one cable holder, at least one data storage device, and at least one cable. The at least one cable holder is attached to the enclosure. A guiding space is defined between the at least one cable holder and a bottom wall of the enclosure. The at least one data storage device is installed in the enclosure and located above the at least one cable holder. The at least one cable is received in the guiding space. The at least one cable holder separates the at least one data storage device from the at least one cable thereby preventing the at least one data storage device and the at least one cable from interfering with each other.

15 Claims, 4 Drawing Sheets ated therein to the fullest extent indicated by the broad general meaning of the terms in which the appended claims are expressed.

COMPUTER SYSTEM WITH SPACE FOR GUIDING CABLES

REFERENCE TO RELATED APPLICATIONS

This application claims all benefits accruing under 35 U.S.C. §119 from China Patent Application No. 201110438366.3, filed on Dec. 24, 2011 in the State Intellectual Property Office of China, the contents of the China Application are hereby incorporated by reference.

BACKGROUND

1. Technical Field

The present disclosure generally relates to computer systems, and particularly relates to a computer system with a space for guiding cables.

2. Description of Related Art

Many computer systems, especially server systems, have a large number of cables for interconnecting their hardware components, such as circuit boards, power supply units, and data storage devices. The cables are often left unsecured or secured in such a way as to interfere with access to the hardware components during repair and maintenance.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
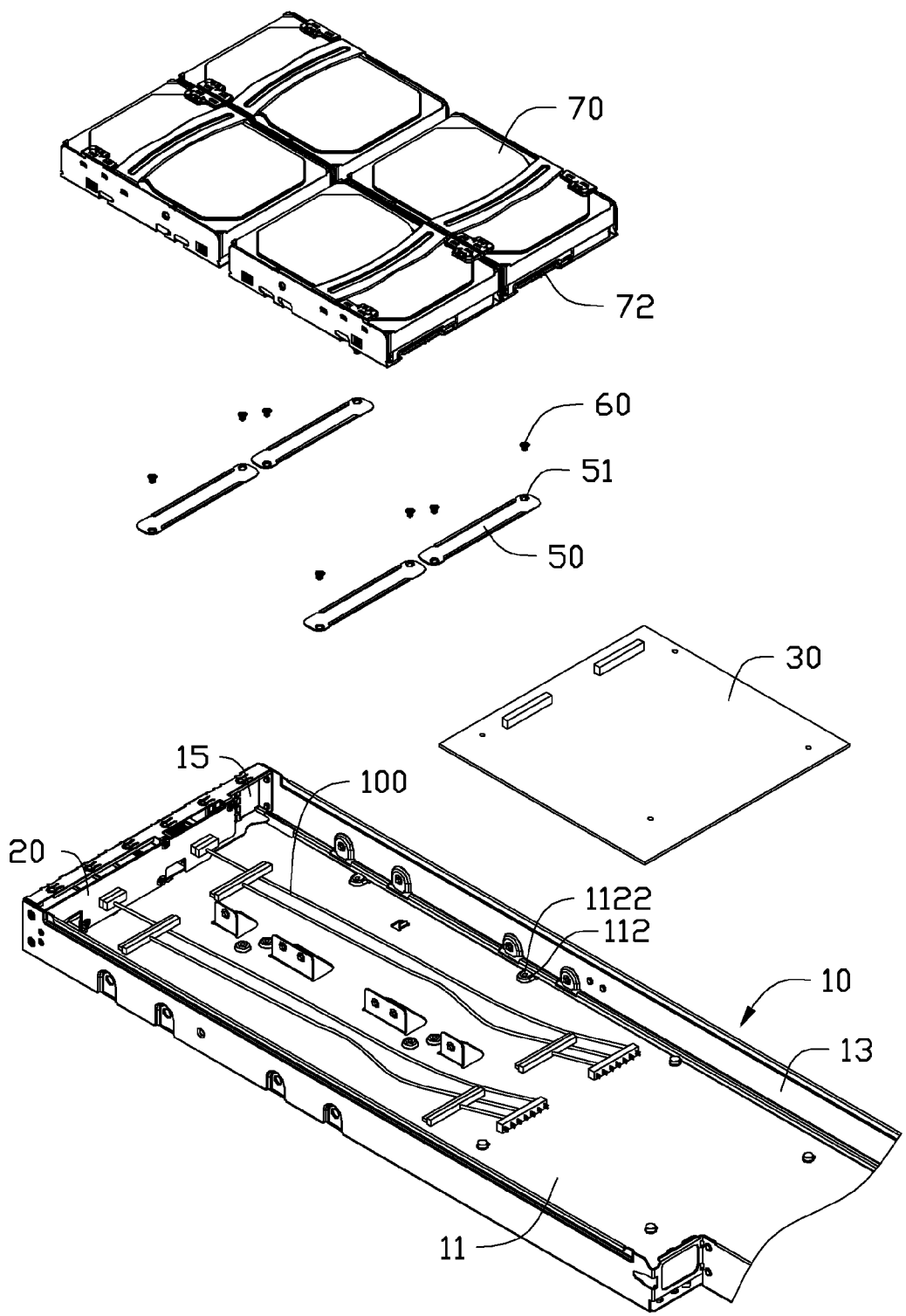
FIG. 1 is an exploded, isometric view of a computer system in accordance with an embodiment.

FIG. 1 illustrates a computer system in accordance with an embodiment. The computer system includes an enclosure 10, an interface circuit board 20, a plurality of cables 100, a plurality of cable holders 50, a base board 30, and a plurality of data storage devices 70. The interface circuit board 20 is installed inside the enclosure 10.

The enclosure 10 includes a bottom wall 11, two sidewalls 13, and a rear wall 15. The two sidewalls 13 are parallel to each other and perpendicular to the bottom wall 11. In some embodiments, the bottom wall 11 is rectangular. A plurality of pairs of spaced securing posts 112 protrudes from the bottom wall 11. Each securing post 112 defines a threaded hole 1122. The interface circuit board 20 is adjacent to the rear wall 15.

In this embodiment, the computer system includes four of the data storage devices 70. Each of the four data storage devices 70 is a hard disk drive and includes an interface 72.

In this embodiment, the computer system include four of the cable holders 50. Each of the four cable holders 50 is an elongated sheet. A securing hole 51 is defined in each of two ends of each of the four cable holders 50. The length of each of the four cable holders 50 is equal to the width of each of the four data storage devices 70. The four cable holders 50 are arranged on a plane parallel to the bottom wall 11.

The interface circuit board 20 may include various interfaces, such as video interfaces, audio interfaces, and data communication interfaces.

Figure 2:
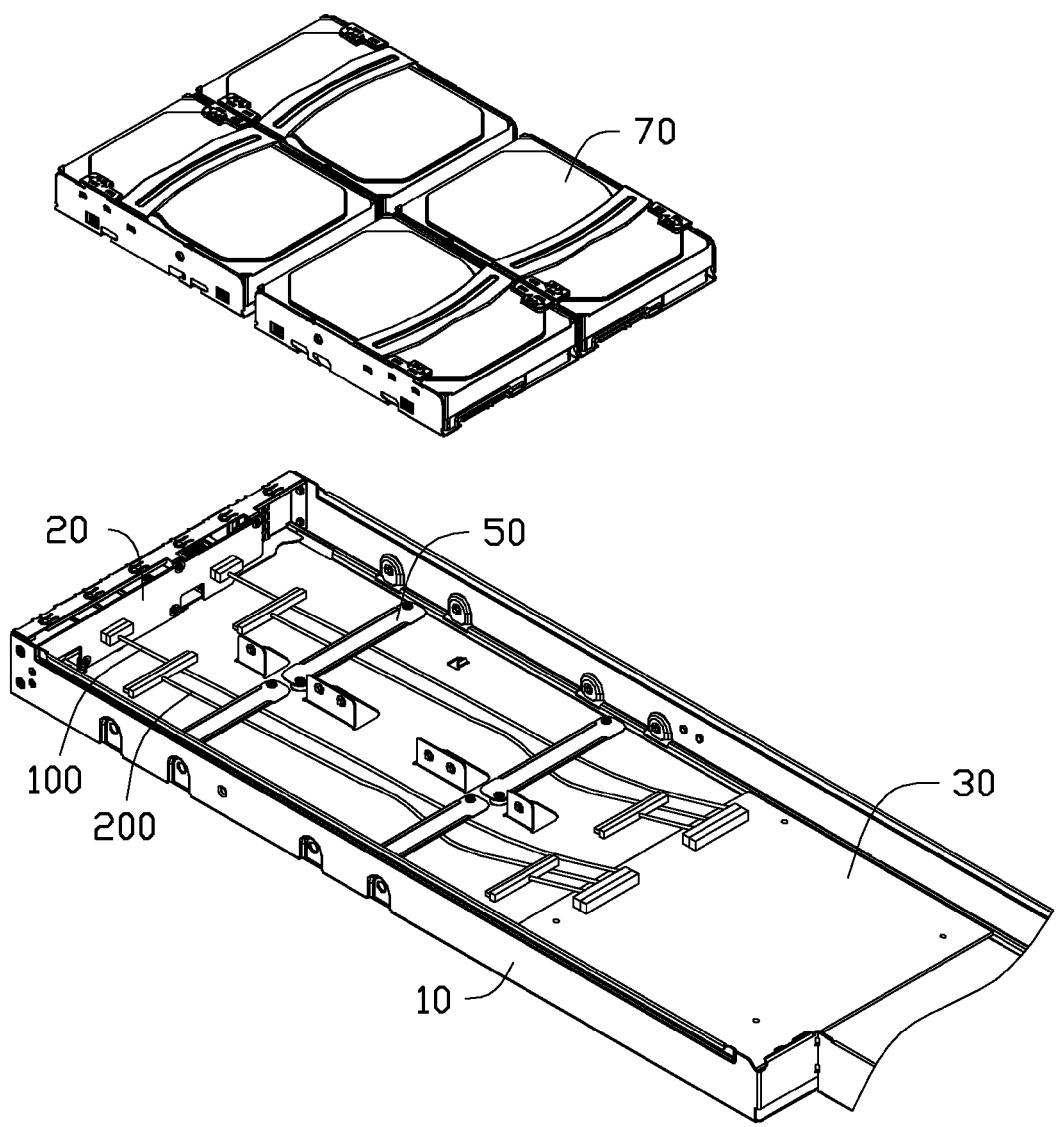
FIG. 2 is a partially assembled view of the computer system of FIG. 1.

Referring to FIG. 2, when attaching the four cable holders 50 to the enclosure 10, the two securing holes 51 of each of the four cable holders 50 are aligned with the corresponding two of the threaded holes 1122. Eight screws 60 are respectively extended through the securing holes 51 and screwed into the corresponding threaded holes 1122 thereby securing each of the cable holder 50 to a pair of spaced securing posts 112. As shown in FIG. 2, two of the four cable holders 50 are arranged in a first line and the other two of the four cable holders 50 are arranged in a second line. The first line and the second line are parallel to each other and perpendicular to the two sidewalls 13 of the enclosure 10. A guiding space 200 is defined between the four cable holders 50 and the bottom wall 11 of the enclosure 10. The cables 100 are received in the guiding space 200.

The base board 30 is installed inside the enclosure 10. The interface circuit board 20 and the base board 30 are located on two opposite sides of the guiding space 200. The cables 100 extend through the guiding space 200 and interconnect the interface circuit board 20 and the base board 30. The extending direction of each of the four cable holders 50 is substantially perpendicular to the extending direction of the cables 100.

Figure 3:
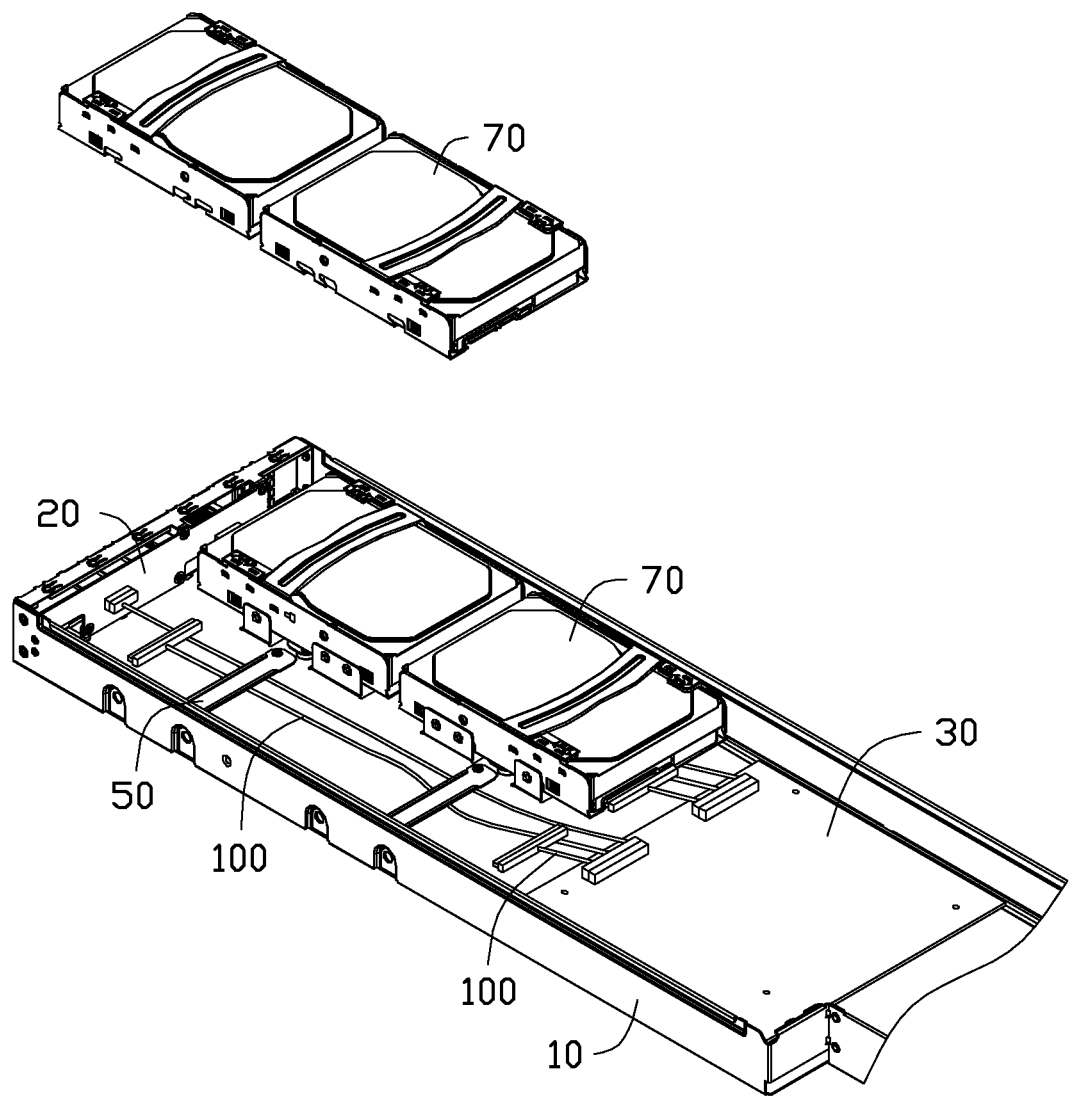
FIG. 3 is another partially assembled view of the computer system of FIG. 1.
Figure 4:
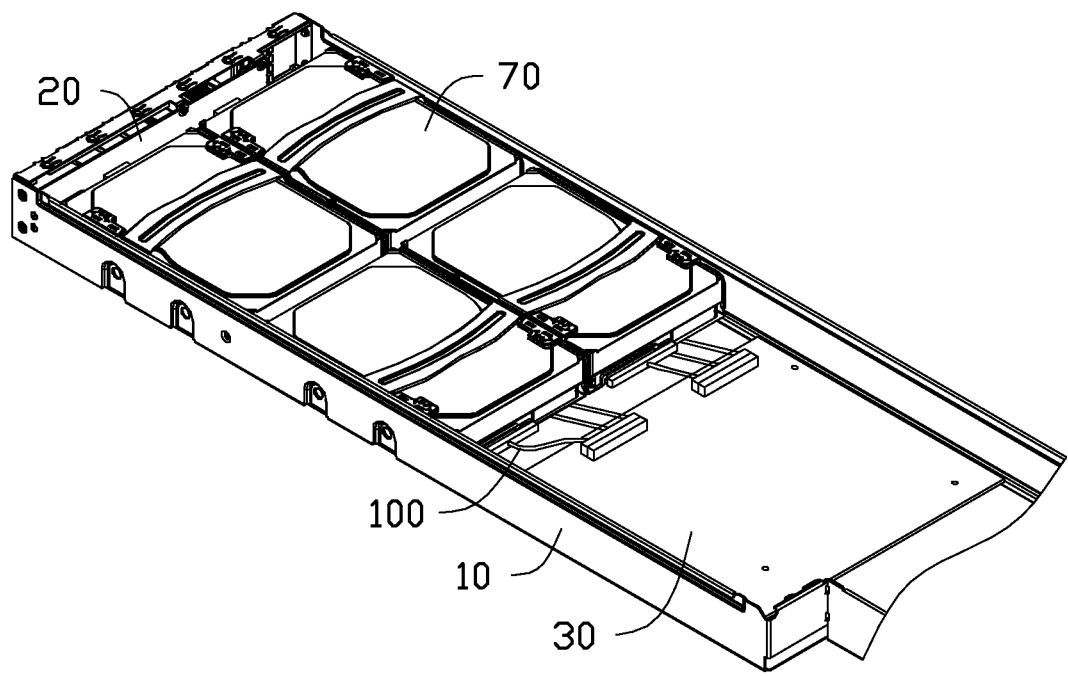
FIG. 4 is an assembled view of the computer system of FIG. 1.

Referring to FIGS. 3 and 4, in assembly, the four data storage devices 70 are installed in the enclosure 10 and arranged in a matrix of 2 by 2. The data storage devices 70 are divided into two pairs. The extending direction of each pair of the data storage devices 70 is parallel to the two sidewalls 13 and substantially perpendicular to the extending direction of the cable holders 50. The interfaces 72 of one pair of the data storage devices 70 face a first direction and the interfaces 72 of the other pair of the data storage devices 70 face a second direction opposite to the first direction. The four data storage devices 70 are located above the four cable holders 50 on a plane parallel to the bottom wall 11 of the enclosure 10. Each of the four cable holders 50 is below the middle of a bottom surface of a corresponding one of the four data storage devices 70. Thus, the four cable holders 50 separate the cables 100 from the four data storage devices 70 and prevent the four data storage devices 70 and the cables 100 from interfering with each other. The four data storage devices 70 may be connected to the interface circuit board 20 or to the base board 30 via the cables 100.

In other embodiments, the shape of each of the cable holder 50 and the number of the cable holders 50 can be changed to meet different requirements. The number of the data storage devices 70 can also be increased or reduced accordingly.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A computer system comprising: an enclosure comprising a bottom wall; at least one cable holder attached to the enclosure, wherein a guiding space is defined between the at least one cable holder and the bottom wall; at least one data storage device installed in the enclosure and located above the at least one cable holder; at least one cable received in the guiding space; wherein the at least one cable holder is configured to separate the at least one data storage device from the at least one cable thereby preventing the at least one data storage device and the at least one cable from interfering with each other; the computer system further comprising an interface circuit board and a base board, wherein the at least one cable is adapted to interconnect the interface circuit board, the base board, and the at least one data storage device; wherein the interface circuit board and the base board are located on two opposite sides of the guiding space and the at least one data storage device; wherein the at least one data storage device comprises four data storage devices; and wherein interfaces of two of the four data storage devices face a first direction, interfaces of the other two of the four data storage devices face a second direction, the first direction is opposite to the second direction.

2. The computer system of claim 1, wherein an extending direction of each of the at least one cable holder is substantially perpendicular to an extending direction of the at least one cable.

3. The computer system of claim 2, wherein the at least one cable holder comprises four cable holders, two of the four cable holders are arranged in a first line, the other two of the four cable holders are arranged in a second line.

4. The computer system of claim 3, wherein the four cable holders are located on a plane.

5. The computer system of claim 4, wherein each of the four data storage devices is located above each of the four cable holders.

6. The computer system of claim 5, wherein the four data storage devices are arranged in a matrix of 2 by 2.

7. The computer system of claim 6, wherein an extending direction of each of the four cable holders is substantially perpendicular to an extending direction of each of the four data storage devices.

8. The computer system of claim 7, wherein a length of each of the four cable holders is substantially equal to a width of each of the four data storage devices.

9. The computer system of claim 8, wherein each of the four cable holders is located below a middle of a bottom surface of each of the four data storage devices.

10. The computer system of claim 2, wherein at least one pair of spaced securing posts protrude from the bottom wall, two ends of each of the at least one cable holder are secured to each of the at least one pair of spaced securing posts.

11. A computer system comprising: an enclosure comprising a bottom wall; two spaced posts protruding from the bottom wall; a cable holder, wherein two ends of the cable holder are mounted to the two spaced posts thereby attaching the cable holder to the enclosure, and a guiding space is defined between the cable holder and the bottom wall; at least one data storage device installed in the enclosure and located above the cable holder; a cable received in the guiding space; wherein the cable holder is configured to separate the at least one data storage device from the cable thereby preventing the at least one data storage device and the cable from interfering with each other; wherein the computer system further comprising an interface circuit board and a base board, wherein the cable is adapted to interconnect the interface circuit board and the base board; wherein the interface circuit board and the base board are located on two opposite sides of the guiding space and the at least one data storage device; wherein the at least one data storage device comprises four data storage devices; and wherein interfaces of two of the four data storage devices face a first direction, interfaces of the other two of the four data storage devices face a second direction, the first direction is opposite to the second direction.

12. The computer system of claim 11, wherein the enclosure further comprises a rear wall perpendicular to the bottom wall, the interface circuit board is located adjacent to the rear wall.

13. The computer system of claim 11, wherein each of the two spaced posts defines a threaded hole, each of the two ends of the cable holder is mounted to each of the two spaced posts by inserting a screw into the threaded hole.

14. The computer system of claim 11, wherein a length of the cable holder is substantially equal to a width of the data storage device.

15. The computer system of claim 14, wherein the cable holder is located below a middle of a bottom surface of the data storage device.

* * * * *